(12) United States Patent
Zhao et al.

(10) Patent No.: US 11,554,322 B2
(45) Date of Patent: Jan. 17, 2023

(54) GAME CONTROLLER WITH TOUCHPAD INPUT

(71) Applicant: Sony Interactive Entertainment LLC, San Mateo, CA (US)

(72) Inventors: Cen Zhao, San Mateo, CA (US); Chung-Hsien Yu, San Mateo, CA (US); Samuel Ian Matthews, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 357 days.

(21) Appl. No.: 16/396,379

(22) Filed: Apr. 26, 2019

(65) Prior Publication Data

US 2020/0338445 A1 Oct. 29, 2020

(51) Int. Cl.

| A63F 13/42 | (2014.01) |
|---|---|
| G06F 3/0354 | (2013.01) |
| G06F 3/023 | (2006.01) |
| A63F 13/2145 | (2014.01) |
| G06N 3/08 | (2006.01) |

(52) U.S. Cl.
CPC .......... *A63F 13/42* (2014.09); *A63F 13/2145* (2014.09); *G06F 3/0236* (2013.01); *G06F 3/0237* (2013.01); *G06F 3/03547* (2013.01); *G06N 3/08* (2013.01); *A63F 2300/1068* (2013.01)

(58) Field of Classification Search
None
See application file for complete search history.

(56) References Cited

U.S. PATENT DOCUMENTS

| 5,680,510 A | 10/1997 | Hon et al. |
|---|---|---|
| 2009/0213081 A1 | 8/2009 | Case, Jr. |
| 2009/0324082 A1 | 12/2009 | Liu et al. |
| 2010/0138221 A1 | 6/2010 | Boys |
| 2010/0283750 A1 | 11/2010 | Kang et al. |
| 2010/0299638 A1 | 11/2010 | Choi |
| 2010/0302190 A1* | 12/2010 | Yeh ............ G06F 3/03547 345/173 |
| 2011/0057903 A1 | 3/2011 | Yamano et al. |
| 2011/0118026 A1 | 5/2011 | Lukas et al. |
| 2012/0113008 A1* | 5/2012 | Makinen ............ G06F 3/0233 345/168 |
| 2014/0359513 A1 | 12/2014 | Starner et al. |

(Continued)

FOREIGN PATENT DOCUMENTS

| TW | 201908955 A | 3/2019 |
|---|---|---|
| WO | 2015192117 A1 | 12/2015 |

OTHER PUBLICATIONS

International Search Report and Written Opinion dated Jul. 1, 2020 in the counterpart PCT application PCT/US20/28099.

(Continued)

*Primary Examiner* — James S. McClellan
*Assistant Examiner* — Peter J Iannuzzi
(74) *Attorney, Agent, or Firm* — John L. Rogitz

(57) ABSTRACT

A game controller includes a touchpad that a user, viewing a virtual keyboard on a screen, can soft-touch to move a cursor on the screen and then hard-touch to move the cursor and also send location data to a processor for inputting a letter from the virtual keyboard. Machine learning is used to predict a next letter or next word.

14 Claims, 15 Drawing Sheets

(56) References Cited

U.S. PATENT DOCUMENTS

| | | | |
|---|---|---|---|
| 2015/0019539 A1* | 1/2015 | Cheung | G06F 40/274 |
| | | | 707/723 |
| 2015/0205781 A1 | 7/2015 | Feng | |
| 2016/0299685 A1* | 10/2016 | Zhai | G06F 3/04886 |
| 2017/0017393 A1 | 1/2017 | Luo et al. | |
| 2018/0018086 A1 | 1/2018 | Bi | |
| 2018/0137412 A1 | 5/2018 | Nikkhah et al. | |
| 2018/0210874 A1* | 7/2018 | Fuxman | G06F 40/35 |
| 2018/0267761 A1* | 9/2018 | Aurongzeb | G06F 3/1423 |
| 2019/0034416 A1 | 1/2019 | Hasan et al. | |
| 2019/0057306 A1 | 2/2019 | Xue et al. | |
| 2020/0019609 A1* | 1/2020 | Yu | G06F 40/186 |
| 2020/0042613 A1* | 2/2020 | Jiang | G06F 16/3347 |

OTHER PUBLICATIONS

Zhao et al., "Microphone on Controller with Touchpad to Take in Audio Swipe Feature Data", related U.S. Appl. No. 16/527,885, Non-Final Office Action dated Jun. 24, 2020.

Zhao et al., "Microphone on Controller with Touchpad to Take in Audio Swipe Feature Data", related U.S. Appl. No. 16/527,885, Non-Final Office Action response filed Jul. 29, 2020.

Zhao et al., "Microphone on Controller with Touchpad to Take in Audio Swipe Feature Data", related U.S. Appl. No. 16/527,885, Applicant's response to Non-Final Office Action filed Jan. 6, 2021.

Zhao et al., "Microphone on Controller with Touchpad to Take in Audio Swipe Feature Data", related U.S. Appl. No. 16/527,885, Non-Final Office Action dated Oct. 6, 2020.

U.S. Appl. No. 16527885, filed Jul. 31, 2019, Cen Zhao.

Zhao et al., "Microphone on Controller with Touchpad to Take in Audio Swipe Feature Data", file history of related U.S. Appl. No. 16/527,885, filed Jul. 31, 2019.

Zhao et al., "Microphone on Controller with Touchpad to Take in Audio Swipe Feature Data", related U.S. Appl. No. 16/527,885, Non-Final Office Action dated Sep. 29, 2021.

Zhao et al., "Microphone on Controller with Touchpad to Take in Audio Swipe Feature Data", related U.S. Appl. No. 16/527,885, Final Office Action dated May 11, 2022.

Zhao et al., "Microphone on Controller with Touchpad to Take in Audio Swipe Feature Data", related U.S. Appl. No. 16/527,885, Applicant's response to Non-Final Office Action filed Mar. 28, 2022.

* cited by examiner

Soft and Hard Press

Soft Press:
moving the cursor only without sending location data.

Hard Press:
Moving the cursor also sending location data

Heatmap Algorithm

Key-based Probability Map

| Q: 0.7 | Q: 0.8 | Q: 0.7<br>W: 0.1 | W: 0.7<br>Q: 0.1 | W: 0.8 | W: 0.7 |
|---|---|---|---|---|---|
| Q: 0.8 | Q: 1 | Q: 0.8 | W: 0.8 | | W: 0.8 |
| Q: 0.6<br>A: 0.2 | : 0.7<br>: 0.3 | Moving to the next letter A. New heatmap is then aggregated:<br>    [Q=0.6, W=0.0, A=0.3, S=0.0]*0.5<br>+  [Q=0.0, W=0.0, A=1.0, S=0.0]*0.5<br>――――――――――――――――<br>    [Q=0.3, W=0.0, A=0.6, S=0.0]<br>Sequence = "QA" | | | W: 0.6<br>S: 0.2 |
| A: 0.6<br>Q: 0.2 | A: .7<br>Q: .3 | | | | S: 0.6<br>W: 0.2 |
| A: 0.8 | A: | A: 0.8<br>S: 0.2 | S: 0.8<br>A: 0.2 | | S: 0.8 |
| A: 0.7 | A: 0.8 | A: 0.7<br>S: 0.1 | S: 0.7<br>A: 0.1 | S: 0.8 | S: 0.7 |

FIG. 8B

GAME CONTROLLER WITH TOUCHPAD INPUT

FIELD

The application relates generally to technically inventive, non-routine solutions that are necessarily rooted in computer technology and that produce concrete technical improvements. In particular, the present application relates to computer simulation controllers with touchpad input.

BACKGROUND

Machine learning, sometimes referred to as deep learning, can be used for a variety of useful applications related to data understanding, detection, and/or classification.

SUMMARY

In computer simulation industries such as gaming industries, multiple data entry modes may exist that can benefit from machine learning to increase precision and robustness.

Accordingly, an apparatus includes at least one processor and at least one computer storage that is not a transitory signal and that includes instructions executable by the processor to receive a touch signal on a touch pad of a computer simulation controller. The instructions are executable to, responsive to the touch signal indicating a first pressure, move a cursor on a display distanced from the controller and not establish a selection of a letter. The instructions also are executable to, responsive to the touch signal indicating a second pressure greater than the first pressure, establish a selection of a first alpha-numeric character and present the first alpha-numeric character on the display.

In an example embodiment, the processor is embodied in the computer simulation controller. Or, the processor may be embodied in a computer simulation console configured for communicating with the computer simulation controller.

In some implementations, the instructions can be executable to, responsive to the touch signal indicating the second pressure, move the cursor on the display. The instructions may be executable to, responsive to the touch signal indicating the first pressure, enlarge an image of a keyboard on the display.

In certain embodiments the instructions can be executable to input the first alpha-numeric character to at least a first neural network (NN) and receive from the first NN a predicted sequence of alpha-numeric characters including at least a first predicted alpha-numeric character. In such embodiments, the instructions may be executable to present on the display, next to the first alpha-numeric character, the predicted sequence of alpha-numeric characters comprising at least the first predicted alpha-numeric character. If desired, the first NN can include plural long short-term memory (LSTM) networks.

In another aspect, a method includes receiving, from a computer simulation controller, a touch signal, and responsive to the touch signal indicating a first pressure, moving a cursor on a display. The method also includes, responsive to the touch signal indicating a second pressure greater than the first pressure, establishing at least a first letter, and presenting the first letter on the display.

In another aspect, an assembly includes at least one computer simulation controller, at least one touchpad supported by the computer simulation controller, and at least one computer storage with instructions executable by at least one processor to present alpha-numeric characters on a display responsive to touch input on the touchpad. The instructions can be executed to present predicted alpha-numeric characters on the display based at least in part on the alpha-numeric characters presented on the display responsive to the touch input on the touchpad.

The details of the present application, both as to its structure and operation, can best be understood in reference to the accompanying drawings, in which like reference numerals refer to like parts, and in which:

DETAILED DESCRIPTION

Figure 1:
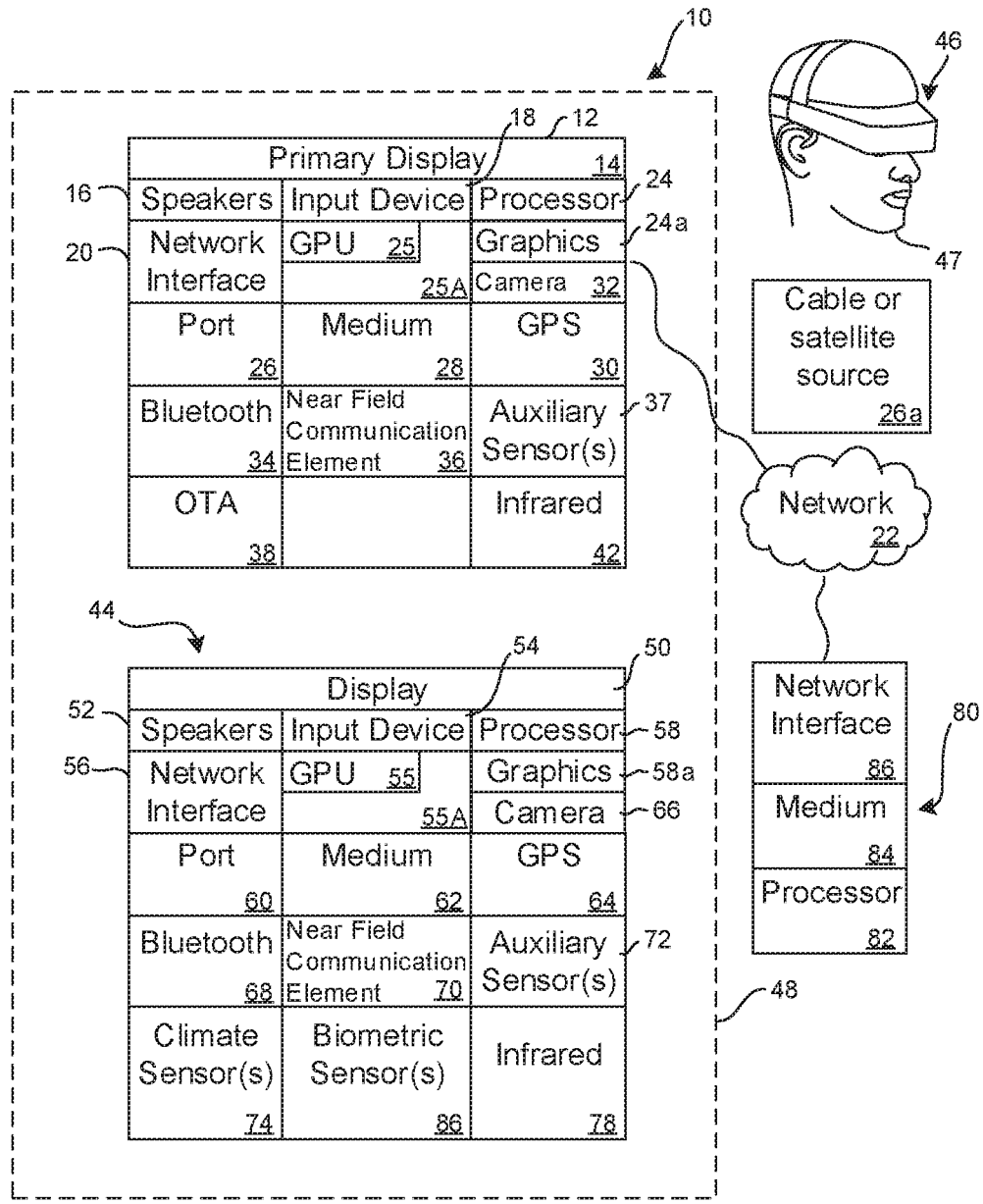
FIG. 1 is a block diagram of an example system consistent with present principles.

This disclosure relates generally to computer ecosystems including aspects of consumer electronics (CE) device networks such as but not limited to distributed computer game networks, augmented reality (AR) networks, virtual reality (VR) networks, video broadcasting, content delivery networks, virtual machines, and artificial neural networks and machine learning applications.

A system herein may include server and client components, connected over a network such that data may be exchanged between the client and server components. The client components may include one or more computing devices including AR headsets, VR headsets, game consoles such as Sony PlayStation® and related motherboards, game controllers, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Orbis or Linux operating systems, operating systems from Microsoft, or a Unix operating system, or operating systems produced by Apple, Inc. or Google. These operating environments may be used to execute one or more programs/applications, such as a browser made by Microsoft or Google or Mozilla or other browser program that can access websites hosted by the Internet servers discussed below. Also, an operating environment according to present principles may be used to execute one or more computer game programs/applications and other programs/applications that undertake present principles.

Servers and/or gateways may include one or more processors executing instructions that configure the servers to receive and transmit data over a network such as the Internet. Additionally, or alternatively, a client and server can be connected over a local intranet or a virtual private network. A server or controller may be instantiated by a game console and/or one or more motherboards thereof such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or video game website to network users to communicate crowdsourced in accordance with present principles.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

As indicated above, present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below may be implemented in hardware circuitry or software circuitry. When implemented in software, the functions and methods can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, an augmented reality (AR) headset, a virtual reality (VR) headset, Internet-enabled or "smart" glasses, another type of wearable computerized device such as a computerized Internet-enabled watch, a computerized Internet-enabled bracelet, a computerized Internet-enabled music player, computerized Internet-enabled head phones, a computerized Internet-enabled implantable device such as an implantable skin device, other computerized Internet-enabled devices, etc. Regardless, it is to be understood that the AVD 12 is configured to undertake present principles (e.g., communicate with other consumer electronics (CE) devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors. Thus, the interface 20 may be, without limitation, a Wi-Fi transceiver, which is an example of a wireless computer network interface, such as but not limited to a mesh network transceiver. Furthermore, note the network interface 20 may be, e.g., a wired or wireless modem or router, or other appropriate interface such as, for example, a wireless telephony transceiver, or Wi-Fi transceiver as mentioned above, etc.

It is to be understood that the one or more processors control the AVD 12 to undertake present principles, including the other elements of the AVD 12 described herein such as controlling the display 14 to present images thereon and receiving input therefrom. The one or more processors may include a central processing unit (CPU) 24 as well as a graphics processing unit (GPU) 25 on a graphics card 25A.

In addition to the foregoing, the AVD 12 may also include one or more input ports 26 such as, e.g., a high definition multimedia interface (HDMI) port or a USB port to physically connect (e.g., using a wired connection) to another consumer electronics (CE) device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignation purposes. The source 26a when implemented as a game console may include some or all of the components described below in relation to the CE device 44 and may implement some or all of the logic described herein.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to, e.g., receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to, for example, determine the location of the AVD 12 in all three dimensions.

Continuing the description of the AVD 12, in some embodiments the AVD 12 may include one or more cameras 32 that may be, e.g., a thermal imaging camera, a digital camera such as a webcam, an infrared (IR) camera, and/or a camera integrated into the AVD 12 and controllable by the processor 24 to generate pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g., for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other consumer electronics (CE) device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as an AR or VR headset worn by a user 47 as shown. In the example shown, only two CE devices 44, 46 are shown, it being understood that fewer or greater devices may also be used in accordance with present principles.

In the example shown, all three devices 12, 44, 46 are assumed to be members of a network such as a secured or encrypted network, an entertainment network or Wi-Fi in, e.g., a home, or at least to be present in proximity to each other in a certain location and able to communicate with each other and with a server as described herein. However, present principles are not limited to a particular location or network unless explicitly claimed otherwise.

The example non-limiting first CE device 44 may be established by any one of the above-mentioned devices, for example, a smart phone, a digital assistant, a portable wireless laptop computer or notebook computer or game controller (also referred to as "console"), and accordingly may have one or more of the components described below. The second CE device 46 without limitation may be established by an AR headset, a VR headset, "smart" Internet-enabled glasses, or even a video disk player such as a Blu-ray player, a game console, and the like. Still further, in some embodiments the first CE device 44 may be a remote control (RC) for, e.g., issuing AV play and pause commands to the AVD 12, or it may be a more sophisticated device such as a tablet computer, a game controller communicating via wired or wireless link with a game console implemented by another one of the devices shown in FIG. 1 and controlling video game presentation on the AVD 12, a personal computer, a wireless telephone, etc.

Accordingly, the first CE device 44 may include one or more displays 50 that may be touch-enabled for receiving user input signals via touches on the display 50. Additionally, or alternatively, the display(s) 50 may be an at least partially transparent display such as an AR headset display or a "smart" glasses display or "heads up" display, as well as a VR headset display, or other display configured for presenting AR and/or VR images.

The first CE device 44 may also include one or more speakers 52 for outputting audio in accordance with present principles, and at least one additional input device 54 such as, for example, an audio receiver/microphone for entering audible commands to the first CE device 44 to control the device 44. The example first CE device 44 may further include one or more network interfaces 56 for communication over the network 22 under control of one or more CE device processors 58. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as, e.g., controlling the display 50 to present images thereon and receiving input therefrom. Furthermore, note that the network interface 56 may be, for example, a wired or wireless modem or router, or other appropriate interface such as a wireless telephony transceiver, or Wi-Fi transceiver as mentioned above, etc.

Still further, note that in addition to the processor(s) 58, the first CE device 44 may also include a graphics processing unit (GPU) 55 on a graphics card 55A. The graphics processing unit 55 may be configured for, among other things, presenting AR and/or VR images on the display 50.

In addition to the foregoing, the first CE device 44 may also include one or more input ports 60 such as, e.g., a HDMI port or a USB port to physically connect (e.g., using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to, e.g., receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to, e.g., determine the location of the first CE device 44 in all three dimensions.

Continuing the description of the first CE device 44, in some embodiments the first CE device 44 may include one or more cameras 66 that may be, e.g., a thermal imaging camera, an IR camera, a digital camera such as a webcam, and/or another type of camera integrated into the first CE device 44 and controllable by the CE device processor 58 to generate pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g., for sensing gesture command), etc.) providing input to the CE device processor 58. The first CE device 44 may include still other sensors such as, for example, one or more climate sensors 74 (e.g., barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid-state storage. In an implementation, the medium 84 includes one or more solid state storage drives (SSDs). The server also includes at least one network interface 86 that allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as a wireless telephony transceiver. The network interface 86 may be a remote direct memory access (RDMA) interface that directly connects the medium 84 to a network such as a so-called "fabric" without passing through the server processor 82. The network may include an Ethernet network and/or fiber channel network and/or InfiniBand network. Typically, the server 80 includes multiple processors in multiple computers referred to as "blades" that may be arranged in a physical server "stack".

Accordingly, in some embodiments the server 80 may be an Internet server or an entire "server farm", and may include and perform "cloud" functions such that the devices of the system 10 may access a "cloud" environment via the server 80 in example embodiments for, e.g., domain adaptation as disclosed herein. Additionally, or alternatively, the server 80 may be implemented by one or more game consoles or other computers in the same room as the other devices shown in FIG. 1 or nearby.

Figure 2:
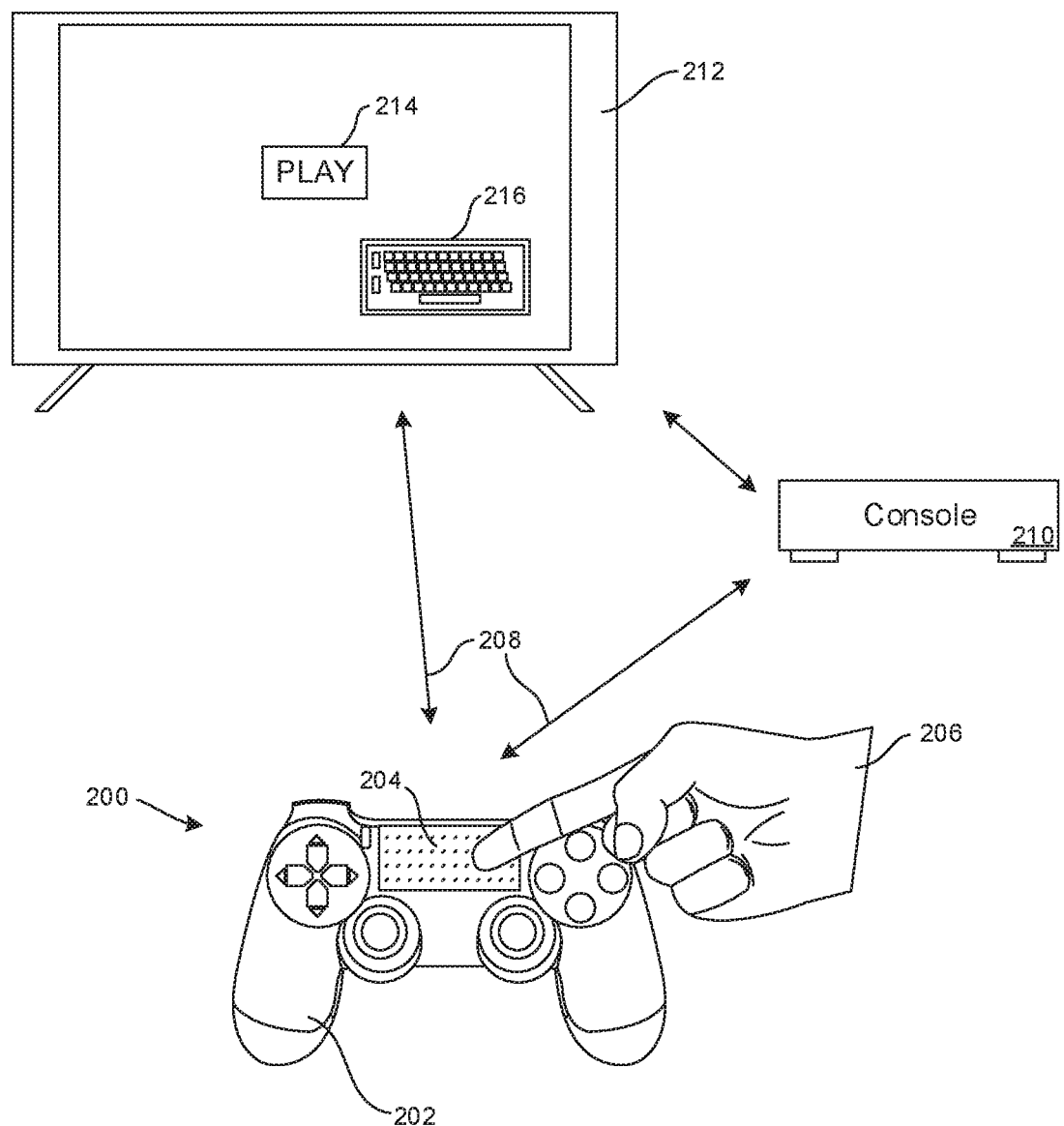
FIG. 2 is a perspective view of a computer simulation controller with a touch pad being used for inputting text presented on a display such as a TV or other audio video device communicating with the game controller directly or via, e.g., a computer game console.

FIG. 2 illustrates a system 200 the components of which may incorporate appropriate components shown in FIG. 1. A computer simulation controller 202 such as a PlayStation® controller, Xbox® controller, or other controller may include a touchpad 204 that can receive touch signals from a hand 206 and communicate via wired and/or wireless paths 208 with a computer simulation console 210 and/or a display device 212 such as an Internet-enabled TV. As explained further below, the user can manipulate the touchpad 204 to generate alpha-numeric characters 214 for presentation on the display device 212 either through direct communication of signals with the display device or through the simulation console 210. More specifically, by manipulating the touchpad 204, a user can move a screen cursor over a letter on a virtual keyboard 216 presented on the display device 212 to enter the alpha-numeric characters 214. The virtual keyboard 216 may have, without limitation, a QWERTY layout.

Figure 3:
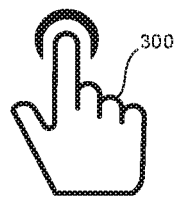
FIG. 3 is a schematic diagram illustrating a soft press and a hard press on the controller touch pad.
Figure 3:
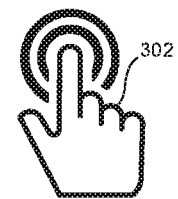

As shown schematically in FIG. 3, present principles contemplate two types of touch, namely, a "soft" press 300 (using a soft pressure on the touchpad or a hover over the touchpad with zero pressure), in which a screen cursor on the display device 212 is moved to desired locations on the virtual keyboard 216 without sending location data (i.e., a signal indicating selection of any particular virtual key) to the display device, and a "hard" press 302 of greater pressure than a soft press, in response to which a screen cursor on the display device 212 may be moved and location data sent to the display device to indicate selection of a virtual key. In this way, a user can look away from the touchpad 204 and view the virtual keyboard 216 while moving his or her finger across the touchpad to move a visible screen cursor to a desired letter on the virtual keyboard, and then exert a hard press to select that letter. Note that an individual "next" letter may not be presented on the display, but rather the next "most possible word" may be displayed after a user has finished a "swipe". The "hottest" key (based on the heatmap) may be highlighted on the virtual keyboard as well as the trace. In addition, a "swipe" is defined as a continuous hard-press which forms a trace.

Figure 4:
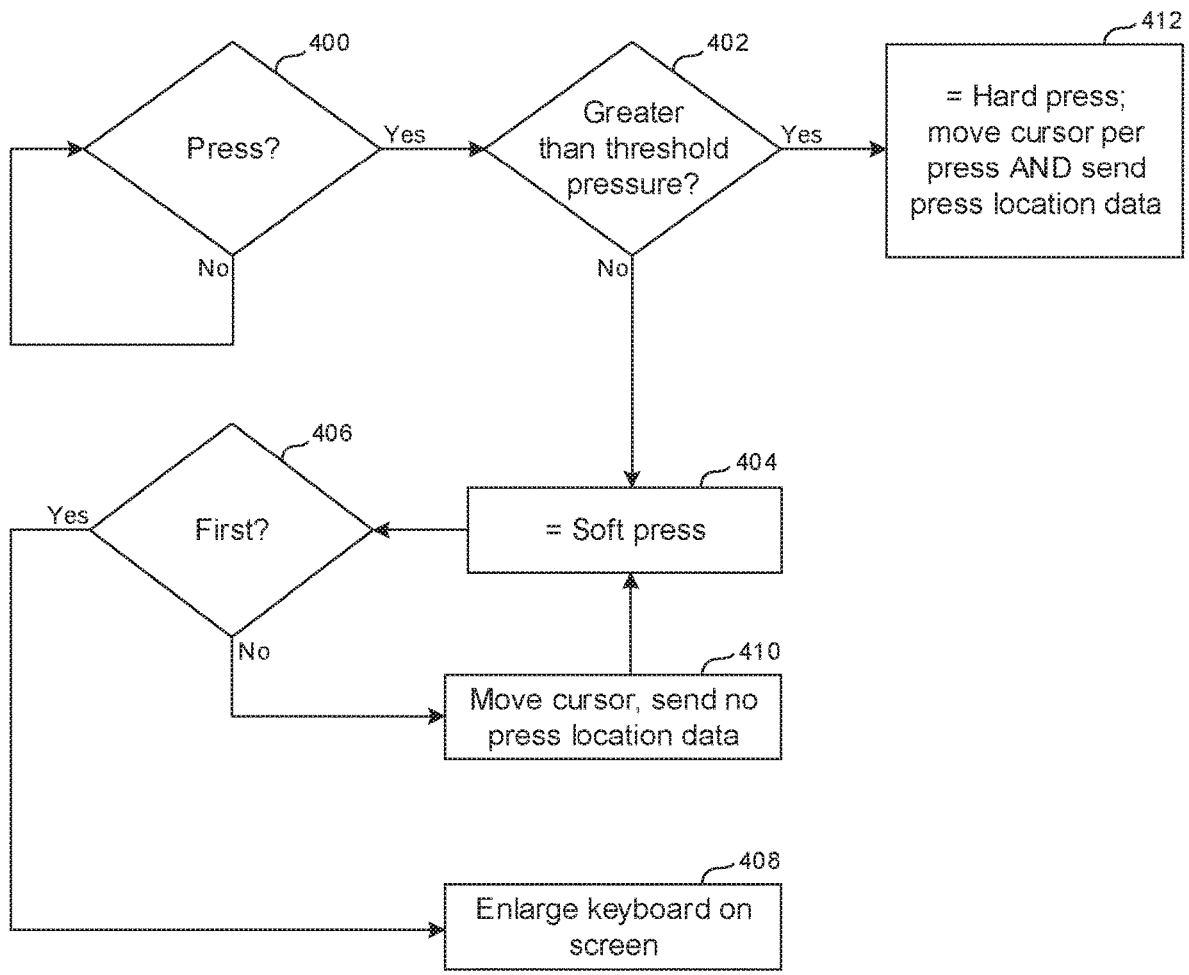
FIG. 4 is a flow chart of example logic consistent with present principles related to FIG. 3.

FIG. 4 illustrates example logic with the above description in mind. The logic may be executed by one or more of a processor in the simulation controller 202, a processor in the simulation console 210, and a processor in the display device 212.

Commencing at state 400 it is determined whether a press of the touchpad 204 has been received. This may be done by determining whether signals from one or more proximity sensors associated with the touchpad 204 indicate a hover of a finger adjacent the touchpad 204 and/or by determining whether signals from one or more pressure sensors associated with the touchpad 204 indicate a pressure of at least a first threshold pressure.

When it is determined that a touch has been received, the logic proceeds to state 402 to determine whether the touch is a soft press or hard press as indicated by, e.g., signals from a pressure sensor associated with the touchpad 204 indicating a touch of at least a threshold pressure, which is typically set to be greater than any threshold pressure used at state 400. If the touch does not satisfy the threshold, the logic moves to block 404 to return a soft press. In some implementations the logic may proceed to state 406 to determine whether the soft press is the first soft press within, e.g., a threshold of period, for example within the last five minutes, and if so the logic can move to block 408 to enlarge an image of the virtual keyboard 216 on the display device 212. In any case, from state 406 if the test there is negative or from block 408, the logic moves to block 410 to move the screen cursor without sending press location information.

On the other hand, if the test at state 402 determines that a hard press is received, such is returned at block 412, and the screen may be moved according to the touch with location information being sent as well indicating the location of the virtual keyboard the user has selected by means of the hard press on the touchpad 204 of the simulation controller 200.

Figure 5:
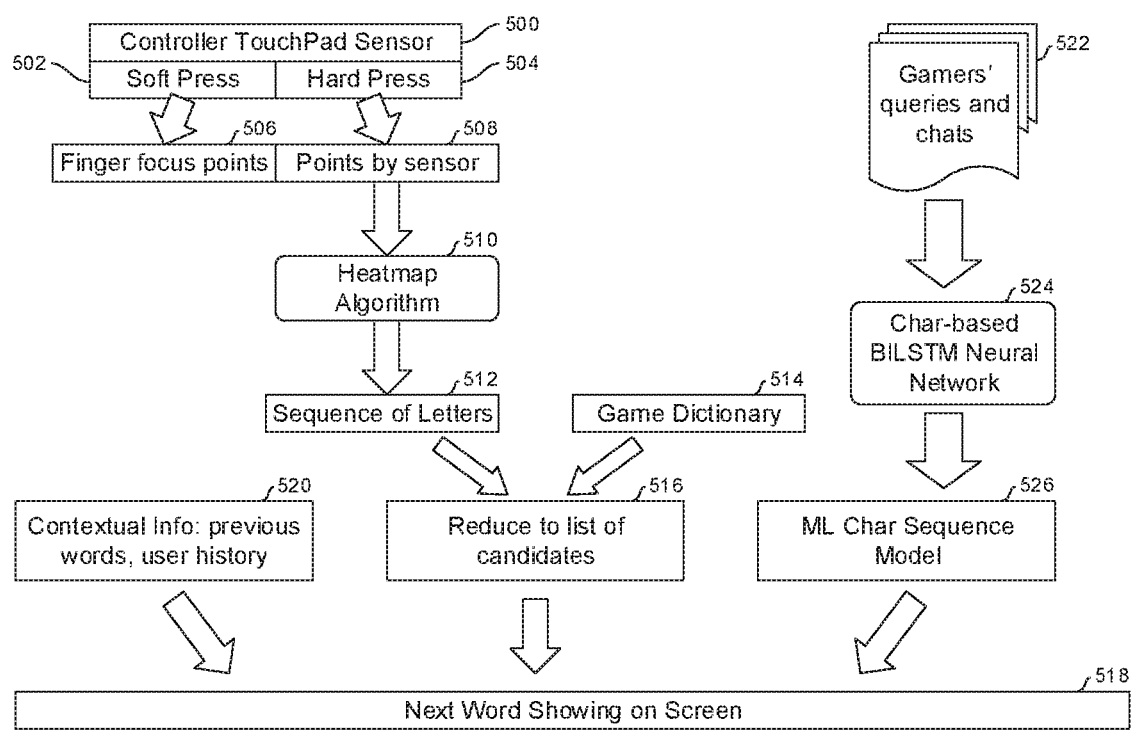
FIG. 5 is a combination of a logic flow chart, data structures, and processing components consistent with present principles.

FIG. 5 illustrates a combination of hardware and software blocks alluded to above.

One or more proximity and/or pressure sensors 500 are provided in the touchpad 204 to output signals representing soft presses 502 and hard presses 504. The soft presses 502 establish finger focus points 506. The hard presses 504 establish points on the touchpad as detected by the sensor(s) 500. A soft-press represents a cursor focus point, while "points by sensor" means "continuous points sending by the sensor".

Figure 6:
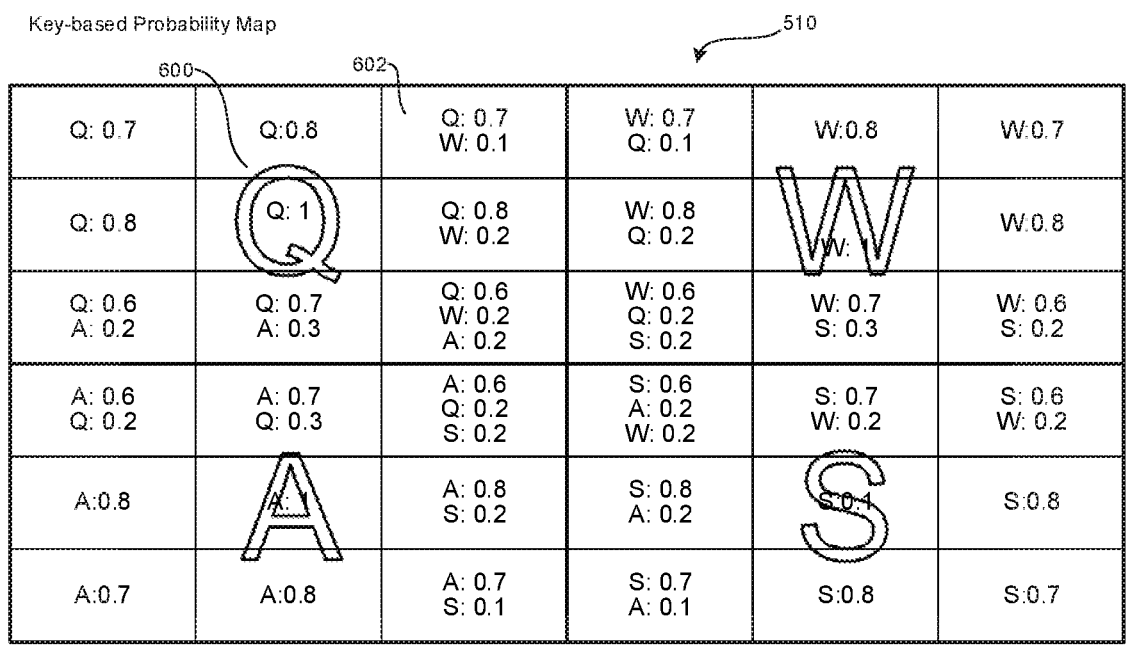
FIGS. 6-8B are schematic diagrams of a data structure referred to as the heat map in FIG. 5, illustrating steps in use.
Figure 7:
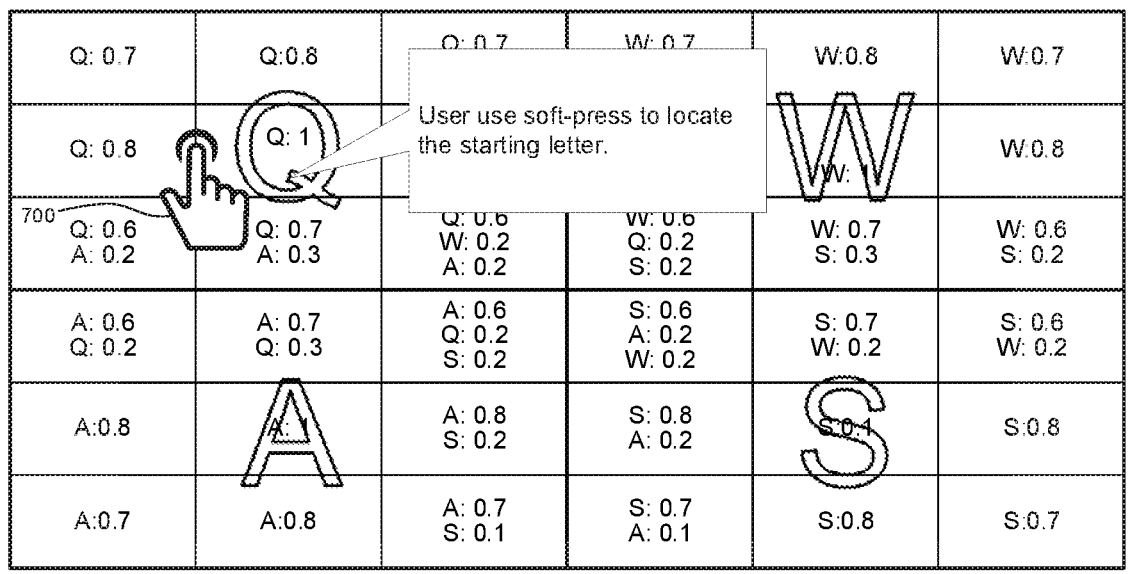
Figure 8:
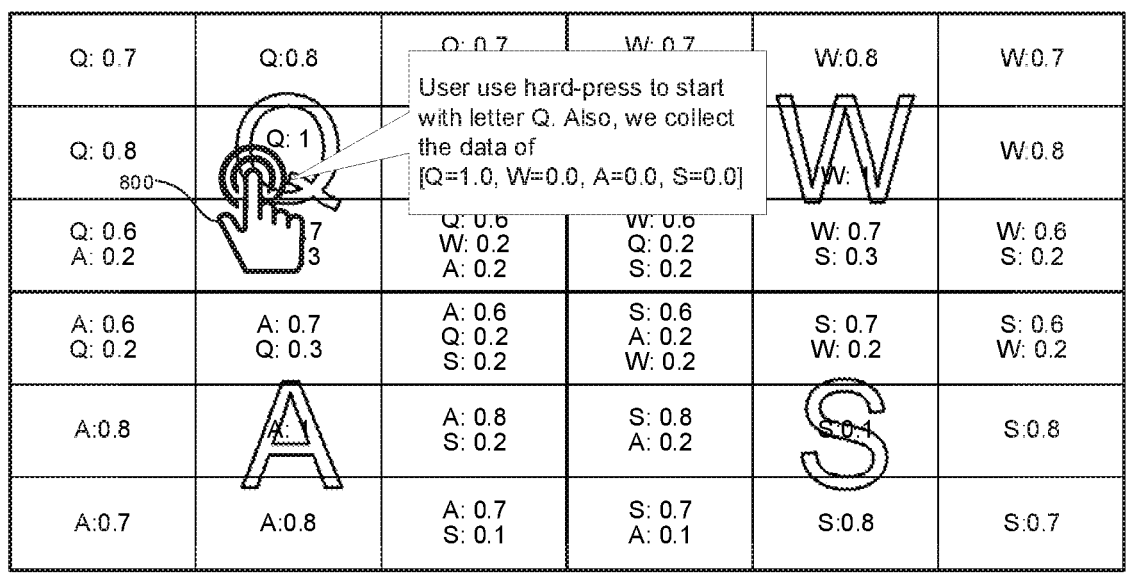

At 510 a heatmap algorithm, discussed further below in reference to FIGS. 6-8, is accessed to output a sequence of letters 512 according to the hard presses 504. The sequence of letters 512 is input along with a dictionary 514 to a reduction block 516 that reduces the list of candidates that might possibly form either a correction to or a completion of the sequence of letters 512. The dictionary 514 is essentially a dictionary and/or thesaurus of sequences of letters that can be used to correct a mis-typed word, e.g., the dictionary 514 may correlate "thw" to "the" to return the word "the" in response to input of "thw".

The reduced list of candidates 516 is provided to a module 518 that outputs a predicted network or words for presentation on the screen, which a user can then select to complete his or her desired input without typing every letter of the predicted word or words. The module 518 may be established by one or more neural networks (NN) as described further below. To produce a predicted word or words, the module 518 may receive input from a contextual user block 520, which provides previous word strings employed by the user with the current input inferred to possibly be a repeat of a prior input, e.g., "do you" may have been followed multiple times in prior inputs by "know what I mean", and this information can be input to help train and execute the module 518.

Moreover, similar training/execution aids may be input to the module 518 as shown at the right of FIG. 5. Specifically, queries and chat data 522 from other computer gamers may be input to a character-based NN such as a bidirectional long short-term memory (BILSTM) 524 to learn patterns of common input strings for provision to a machine learning character sequence model 526. This model 526 may be input to or accessed by the module 518 in rendering a next predicted word or words.

FIGS. 6-8B illustrate employment of the heatmap algorithm 510 in FIG. 5. Basically, the "path" or "connected points" of the finger "swipe" (hard-press) and the probabilities of each letter are "discounted and accumulated" at certain time interval along the swipe. At each time interval, the letter with the highest probability is extracted, which may also have to pass a certain threshold to add to the sequence as developed further below.

In FIGS. 6-8B, it is to be understood that only the first four letters in the top left corner of a QWERTY keyboard (i.e., Q, next to which is "W", and below which from left to right are "A" and "S") are shown for clarity of disclosure, as but one example of a possible virtual keyboard layout for the virtual keyboard 216. In the example heatmap 510 illustrated, each area of the heatmap for a particular letter is divided into a three-by-three grid for nine divisions (illustrated as geometric squares) total, with the center division 600 for a particular letter indicating that the probability of that letter being desired when a cursor is in the center area being 1. In contrast, the heatmap 510 indicates probabilities less than one but greater than zero in the border divisions 602 that surround the center division 600 of a letter, with the probabilities being associated with the letter of the center division 600 and the letter(s) immediately adjacent the border divisions 602 (or, in the case of a border division that is not adjacent another letter, only a probability less than one for the letter of the center division).

As shown in FIG. 7 at 700, a soft press is used to locate the starting letter of an intended input. Then, as shown at 800 in FIG. 8, a hard press is used to indicate selection of the starting letter, in the example shown, "Q". This causes the collection of data that "Q" is selected with a probability of one and that surrounding letters (in the example shown, "W", "A", and "S") are not selected, i.e., have a probability of zero.

Figure 8A:
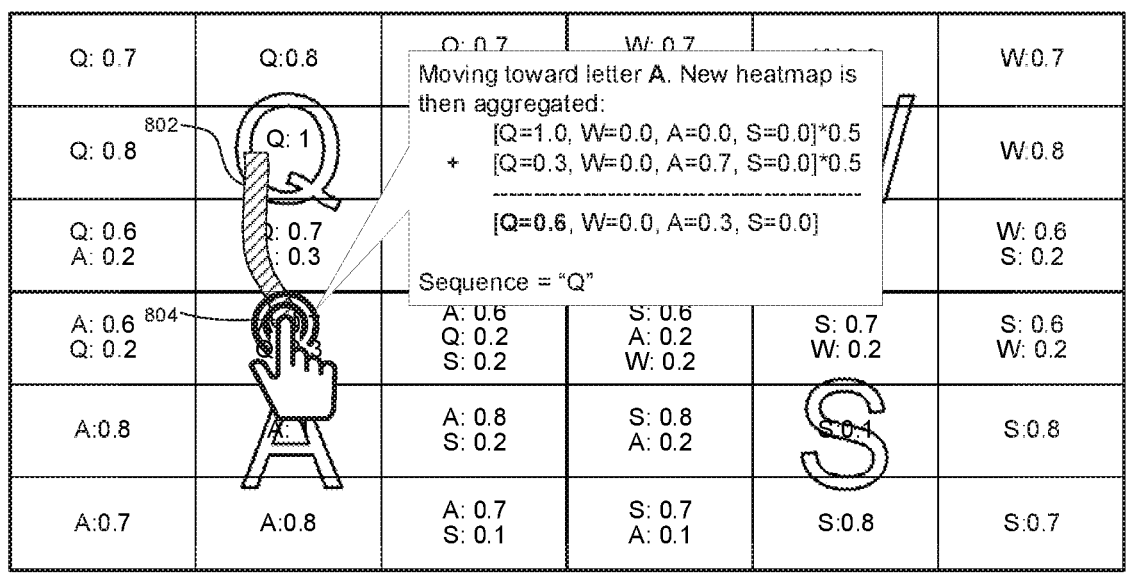

FIGS. 8A and 8B illustrate the results of an ensuing swipe. In FIG. 8A a swipe is shown at 802 from the location starting in FIG. 8 to the location 804 indicated by the image of the hand. Here, the user has moved his finger toward the letter "A". This causes new heatmap statistics to be aggregated according to the path of the swipe over the border divisions 602 using the algorithm shown in FIG. 8A. Because the probability of "Q" is higher than the probabilities of "W" (which is zero), "A" (which is 0.3), and "S" (which is zero), the sequence returns "Q".

FIG. 8B shows at 806 that the swipe has been continued to the location 808 shown by the image of the hand. This causes further heatmap statistics to be aggregated according to the path of the swipe over the border divisions 602 using the algorithm shown in FIG. 8B. Because the probability of "A" is higher than the probabilities of "W" (which is zero), "Q" (which is 0.3), and "S" (which is zero), the sequence returns "A" to be appended after "Q" was returned in FIG. 8A, resulting in a sequence "QA".

Thus, it may now be appreciated that the "path" or "connected points" of the finger "swipe" (hard-press) is tracked and the probabilities of each letter are discounted and accumulated at certain time intervals along the swipe. At each time interval, the letter with the highest probability is extracted, in some embodiments provided the probability of the letter satisfies a threshold probability (e.g., of 0.4) to be added to the sequence.

Figure 9:
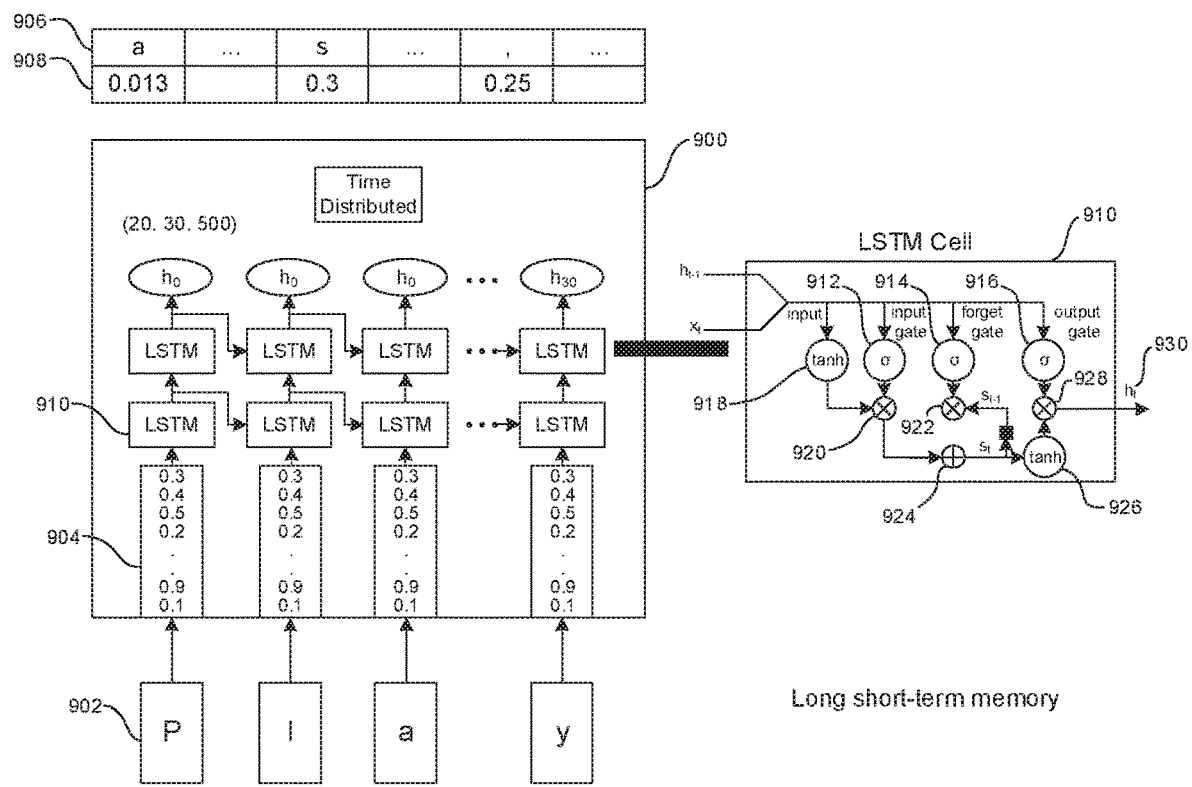
FIG. 9 is a block diagram of an example neural network (NN) configured as plural long short-term memory (LSTM) networks for outputting a predicted next word based on current user input.

FIG. 9 illustrates an example NN architecture that may be used in any of the NN-based modules of, e.g., FIG. 5. A network 900 of NN may receive input letters 902 with probabilities 904 from the heatmap to output time-distributed predicted letters 906 with associated probabilities 908. In the example shown, each letter 902 may be input to a respective recurrent NN (RNN) such as a sequence of long short-term memory (LSTM) 910 as shown. An LSTM 910 as shown at the right in FIG. 9 may include an input gate 912, a forget gate 914, and an output gate 916, all of which may execute a sigmoid function as indicated by the Greek letter a in FIG. 9. The input gate 912 controls the extent to which a new value flows into the cell, the forget gate 914 controls the extent to which a value remains in the cell and the output gate 916 controls the extent to which the value in the cell is used to compute the output activation of the LSTM unit.

The current value $x_i$ being input and the hidden state $h_{t-1}$ from the previous iteration are input to all three gates as shown. The output of the sigmoid function of the input gate 912 may be combined with a hyperbolic tangent function 918 at a first combine operator 920, which may be an element-wise product. The output of the first combine operator 920 is combined, as by summing if desired, with the output of s second combine operator 922 at a third combine operator 924. The output of the third combine operator 924 may be fed back to the second combine operator 922 for combining with the output of the forget gate 914. Further, the output of the third combine operator 924 may be operated on if desired by a hyperbolic tangent function 926 and then combined at a fourth combine operator 928 with the output of the output gate 916 to render a hidden state vector 930 for use in the succeeding iteration.

Figure 10:
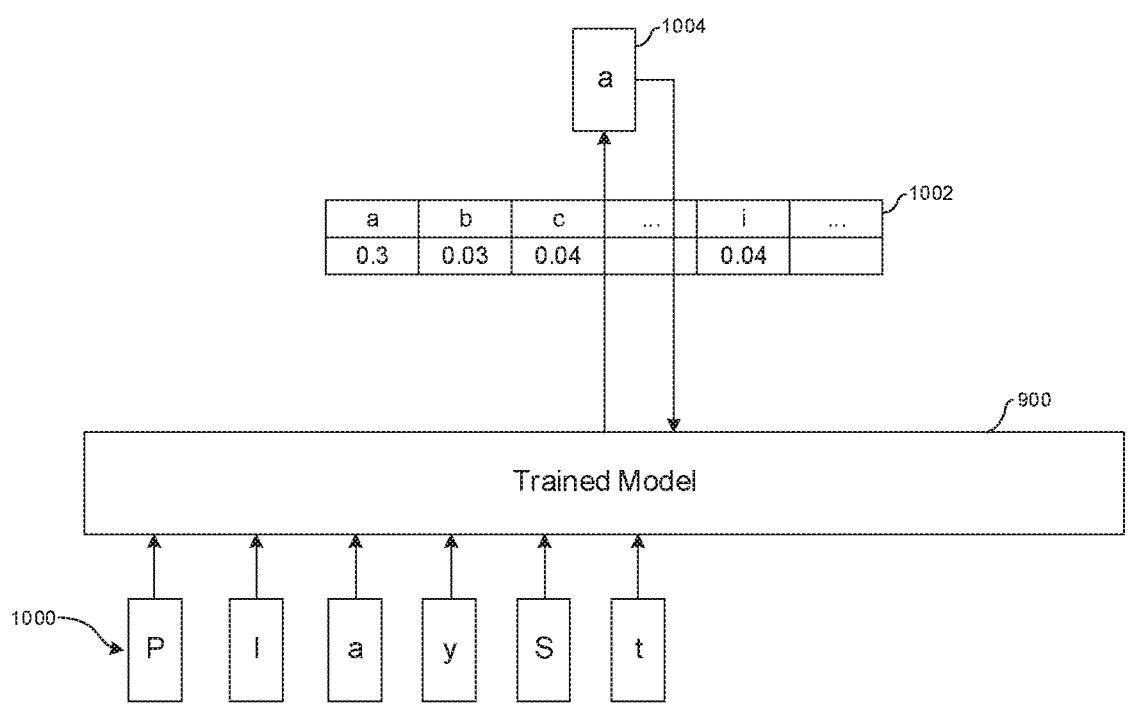
FIGS. 10-12 are schematic diagrams illustrating operation of the NN in FIG. 9 post-training.
Figure 11:
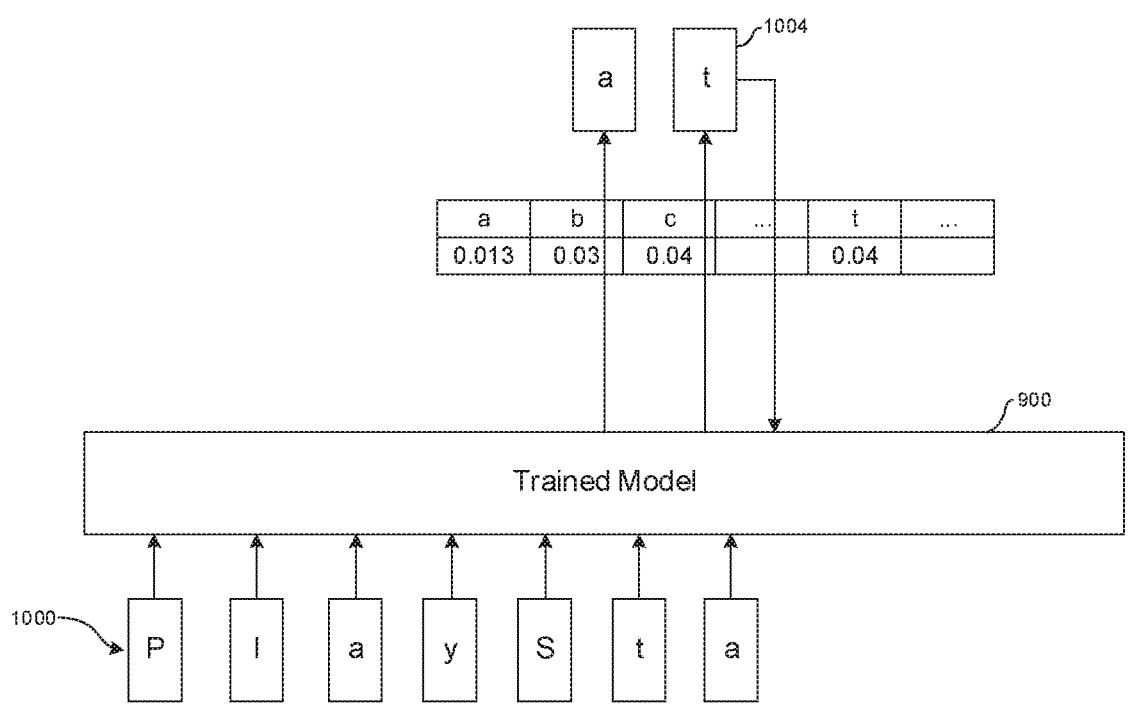
Figure 12:
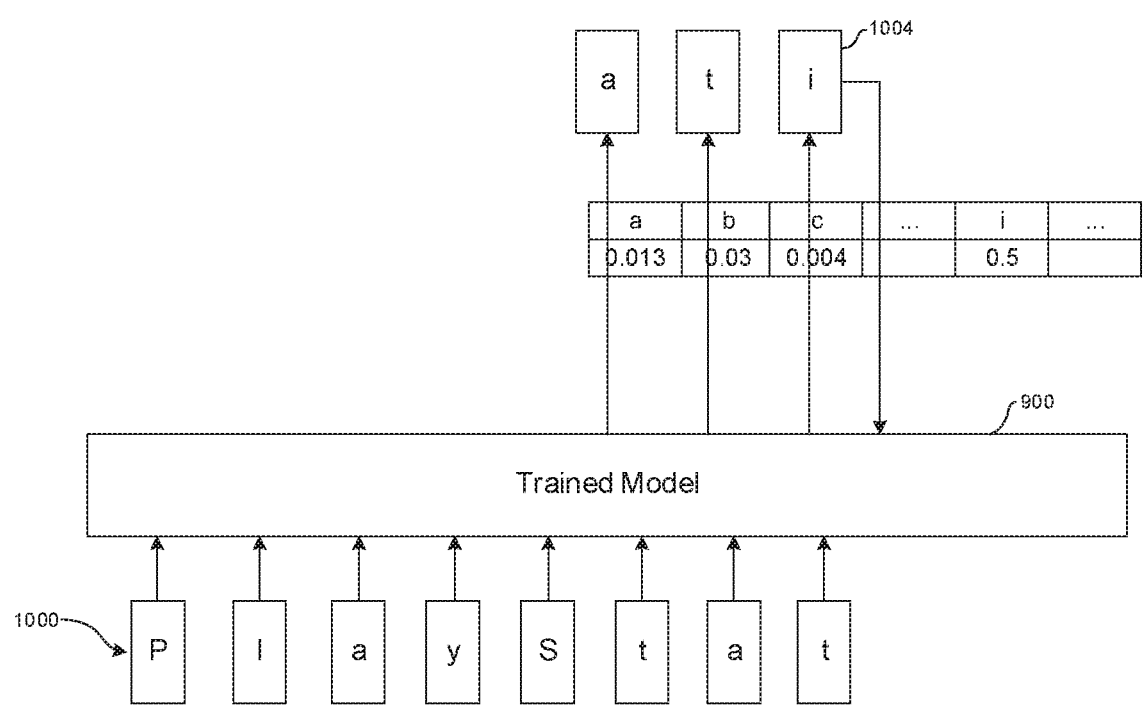

FIGS. 10-12 illustrate a sequence of the use of the network 900 to generate predicted text. The lower row of letters 1000 represents input received from hard presses on keys of the virtual keyboard 216 and/or from selection of previously predicted letters and/or words. These are input to the trained network 900. Using probabilities correlated with letters from the heatmap as illustrated at 1002, a next predicted letter 1004 is generated and fed back to the model. The sequence shown in FIGS. 10-12 generated predicted letters for an initial input of "play" that results in the word "PlayStation".

Figure 13:
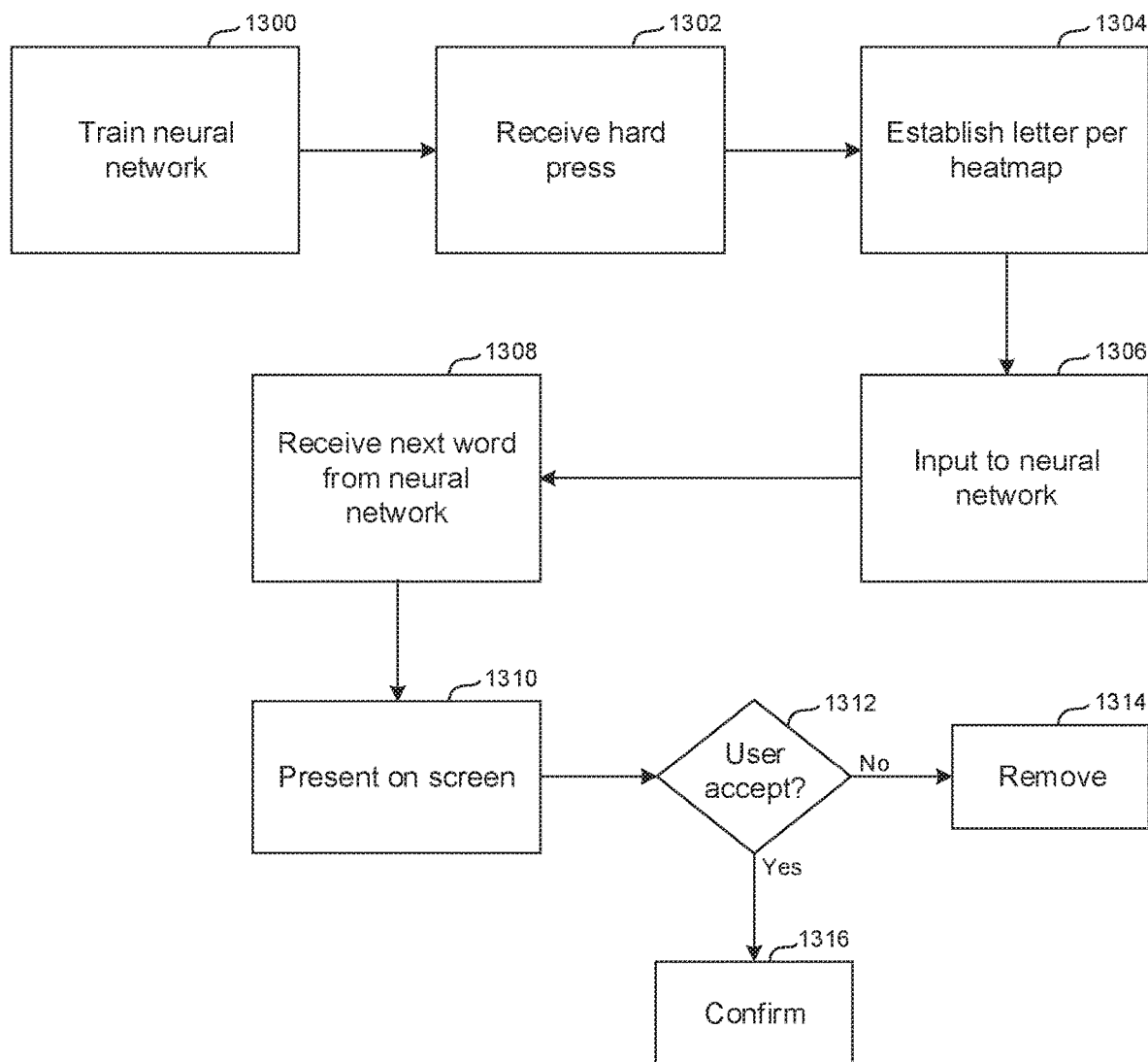
FIG. 13 is a flow chart of example overall logic consistent with present principles.

FIG. 13 is a flow chart of example logic consistent with present principles. The NN system(s) described herein are trained at block 1300. Moving to block 1302, a hard press is received on the touchpad and a letter established based thereon at block 1304 using the heatmap if desired. The letter is input to the NN system at block 1306, which outputs a predicted letter or words or string of words at block 1308. The predicted letters/words are presented on screen at block 1310.

If a user does not accept the predictions at state 1312, they may be removed from presentation at state 1314. Otherwise, accepted predictions are confirmed at block 1316 and presented in sequence after the letters established by the hard press.

Present principles may be used in all possible deep learning-based methods for image, video and audio data processing, among others.

As may be appreciated from the foregoing detailed description, present principles thus improve the adaptation and training of neural networks through the technological solutions described herein.

It will be appreciated that whilst present principals have been described with reference to some example embodiments, these are not intended to be limiting, and that various alternative arrangements may be used to implement the subject matter claimed herein.

What is claimed is:

1. An apparatus, comprising:
at least one computer storage that is not a transitory signal and that comprises instructions executable by at least one processor to:
receive a touch signal on a touch pad of a computer simulation controller;
responsive to the touch signal indicating a first pressure, move a cursor on a display distanced from the controller and not establish a selection of a letter;
responsive to the touch signal indicating a second pressure greater than the first pressure, establish a selection of a first alpha-numeric character and present the first alpha-numeric character on the display;
input the first alpha-numeric character to at least a first neural network (NN); and
receive from the first NN a predicted sequence of alpha-numeric characters comprising at least a first predicted alpha-numeric character, wherein the first NN comprises plural long short-term memory (LSTM) networks.

2. The apparatus of claim 1, wherein the processor is embodied in the computer simulation controller.

3. The apparatus of claim 1, wherein the processor is embodied in a computer simulation console configured for communicating with the computer simulation controller.

4. The apparatus of claim 1, wherein the instructions are executable to:
responsive to the touch signal indicating the second pressure, move the cursor on the display.

5. The apparatus of claim 1, wherein the instructions are executable to:
responsive to the touch signal indicating the first pressure, enlarge an image of a keyboard on the display.

6. The apparatus of claim 1, wherein the instructions are executable to:
present on the display, next to the first alpha-numeric character, the predicted sequence of alpha-numeric characters comprising at least the first predicted alpha-numeric character.

7. A method comprising:
receiving, from a computer simulation controller, a touch signal;
responsive to the touch signal indicating a first pressure, moving a cursor on a display;
responsive to the touch signal indicating a second pressure greater than the first pressure, establishing at least a first letter at least in part using heat map statistics, the heat map statistics representing a path of a finger swipe with probabilities of each letter associated with the path being identified at time intervals along the swipe, wherein at each time interval, a letter with a highest probability is identified as the first letter; and
presenting the first letter on the display.

8. The method of claim 7, comprising:

inputting the first letter to at least a first neural network (NN); and presenting on the display at least a first predicted letter generated by the first NN.

9. The method of claim 8, comprising:

presenting on the display at least a sequence of predicted letters comprising the first predicted letter generated by the first NN.

10. The method of claim 8, comprising:

inputting the first NN words previously input to the computer simulation controller usable by the first NN to generate the first predicted letter.

11. A method comprising:

receiving, from a computer simulation controller, a touch signal;

responsive to the touch signal indicating a first pressure, moving a cursor on a display;

responsive to the touch signal indicating a second pressure greater than the first pressure, establishing at least a first letter;

inputting the first letter to at least a first neural network (NN);

presenting on the display at least a first predicted letter generated by the first NN; and training the first NN using text input by computer simulation players on a network.

12. The method of claim 11, wherein the training comprises processing the text input by computer simulation players using at least one bidirectional long short-term memory (LSTM) network.

13. A method comprising:

receiving, from a computer simulation controller, a touch signal;

responsive to the touch signal indicating a first pressure, moving a cursor on a display;

responsive to the touch signal indicating a second pressure greater than the first pressure, establishing at least a first letter;

inputting the first letter to at least a first neural network (NN);

presenting on the display at least a first predicted letter generated by the first NN; and inputting to the first NN words from a simulation dictionary usable by the first NN to generate the first predicted letter.

14. A method comprising:

receiving, from a computer simulation controller, a touch signal;

responsive to the touch signal indicating a first pressure, moving a cursor on a display;

responsive to the touch signal indicating a second pressure greater than the first pressure, establishing at least a first letter;

inputting the first letter to at least a first neural network (NN);

presenting on the display at least a first predicted letter generated by the first NN; and inputting to the first NN data from a character sequence model generated by at least one bidirectional long short-term memory (LSTM) network and usable by the first NN to generate the first predicted letter.

\* \* \* \* \*